(12) United States Patent
Burke et al.

(10) Patent No.: US 11,023,394 B2
(45) Date of Patent: Jun. 1, 2021

(54) SOCKET INTERCONNECTOR WITH COMPRESSIBLE BALL CONTACTS FOR HIGH PAD COUNT MEMORY CARDS

(71) Applicant: WESTERN DIGITAL TECHNOLOGIES, INC., San Jose, CA (US)

(72) Inventors: John Burke, San Jose, CA (US); Yoseph Pinto, Tel Aviv (IL)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/434,365

(22) Filed: Jun. 7, 2019

(65) Prior Publication Data

US 2020/0264990 A1    Aug. 20, 2020

Related U.S. Application Data

(60) Provisional application No. 62/807,378, filed on Feb. 19, 2019.

(51) Int. Cl.
*G06F 13/16* (2006.01)
*G06F 13/42* (2006.01)
(Continued)

(52) U.S. Cl.
CPC ...... *G06F 13/1668* (2013.01); *G06F 13/4282* (2013.01); *H01R 12/7076* (2013.01);
(Continued)

(58) Field of Classification Search
CPC ...... G06K 7/0008; G06K 7/065; H01R 31/06; H01R 12/721; H01R 13/193; H01R 13/639
See application file for complete search history.

(56) References Cited

U.S. PATENT DOCUMENTS

| 5,490,040 A | 2/1996 | Gaudenzi et al. |
| 2005/0279838 A1* | 12/2005 | Wang ............... G06K 19/07732 235/492 |

(Continued)

FOREIGN PATENT DOCUMENTS

WO    2014093356 A1    6/2014

OTHER PUBLICATIONS

U.S. Appl. No. 16/438,945, filed Jun. 12, 2019.
International Search Report and Written Opinion dated Mar. 9, 2020 in International Patent Application No. PCT/US2019/063721.

*Primary Examiner* — Getente A Yimer
(74) *Attorney, Agent, or Firm* — Vierra Magen Marcus LLP

(57) ABSTRACT

A memory card socket interconnector is disclosed including a pair of cavities configured to receive a pair of memory cards. The cavities include patterns of memory card interconnect pads. A second surface of the socket interconnector includes socket interconnect pads, distributed across the second surface of the socket interconnector, which are electrically coupled to the memory card interconnect pads. The memory card socket interconnector may further include electrically conductive balls provided between the memory card pads and the memory card interconnect pads in each cavity to enable good electrical contact between the memory card pads and the memory card interconnect pads.

20 Claims, 11 Drawing Sheets

(51) Int. Cl.
  *H01R 12/71* (2011.01)
  *H01R 12/72* (2011.01)
  *H01R 12/70* (2011.01)

(52) U.S. Cl.
  CPC ......... *H01R 12/712* (2013.01); *H01R 12/721* (2013.01); *G06F 2213/0026* (2013.01)

(56) References Cited

U.S. PATENT DOCUMENTS

| | | | |
|---|---|---|---|
| 2005/0281010 A1* | 12/2005 | Wang | H05K 1/117 |
| | | | 361/752 |
| 2009/0166838 A1 | 7/2009 | Gokan et al. | |
| 2009/0237372 A1* | 9/2009 | Kim | G06F 3/0482 |
| | | | 345/173 |
| 2009/0253301 A1 | 10/2009 | Chang et al. | |
| 2010/0025480 A1 | 2/2010 | Nishizawa et al. | |
| 2013/0151755 A1* | 6/2013 | Elhamias | G06F 3/0634 |
| | | | 711/103 |
| 2014/0199875 A1* | 7/2014 | Choi | G06K 13/085 |
| | | | 439/346 |
| 2014/0203081 A1* | 7/2014 | Yun | G06K 7/10851 |
| | | | 235/436 |
| 2017/0125959 A1* | 5/2017 | Han | G06K 19/07739 |
| 2020/0072873 A1* | 3/2020 | Crippa | G01R 1/07342 |

* cited by examiner

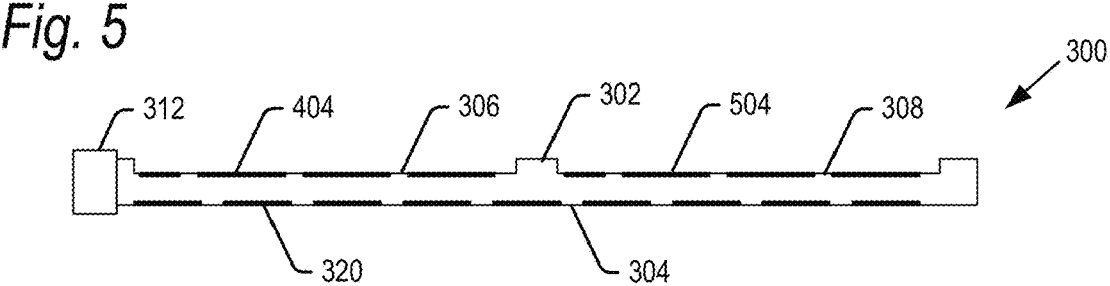
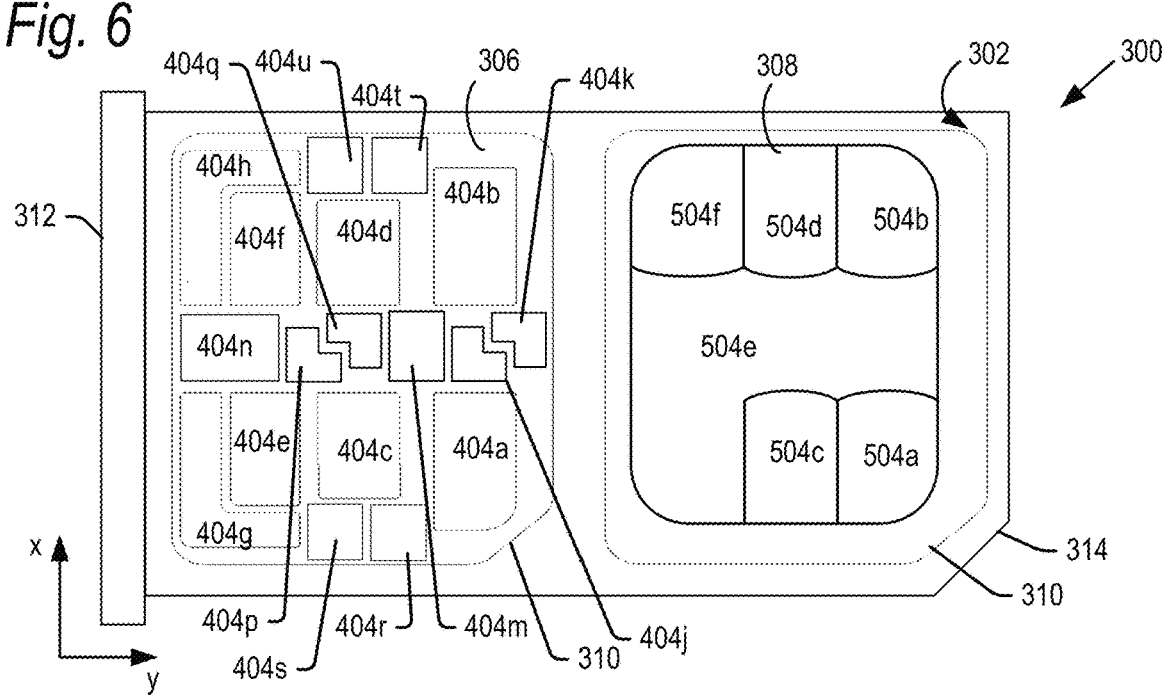
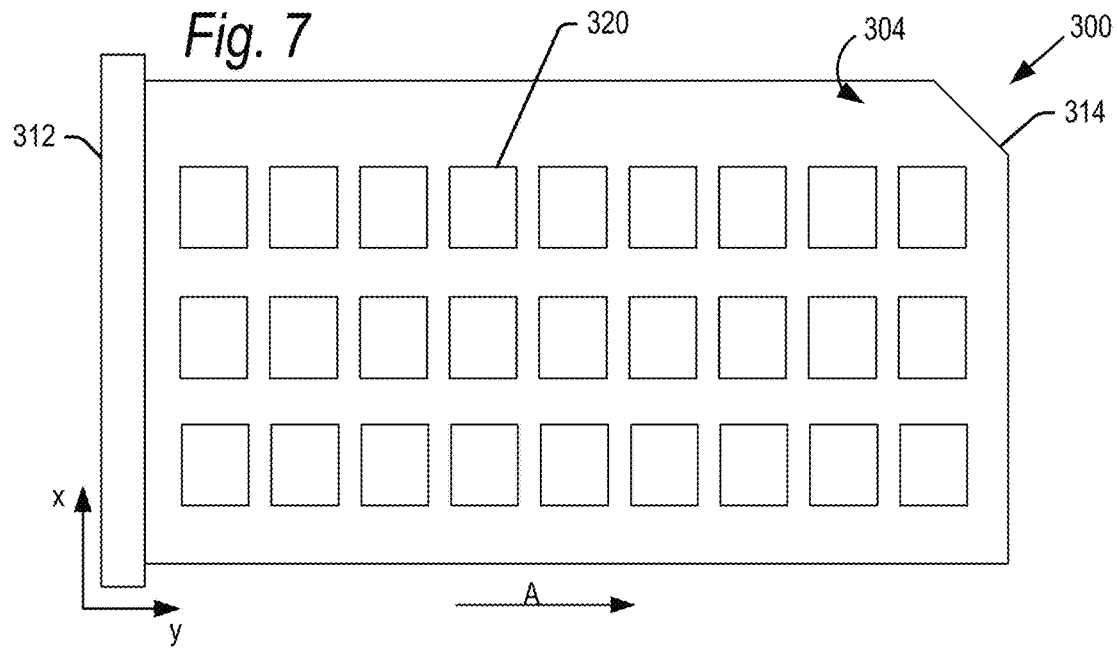

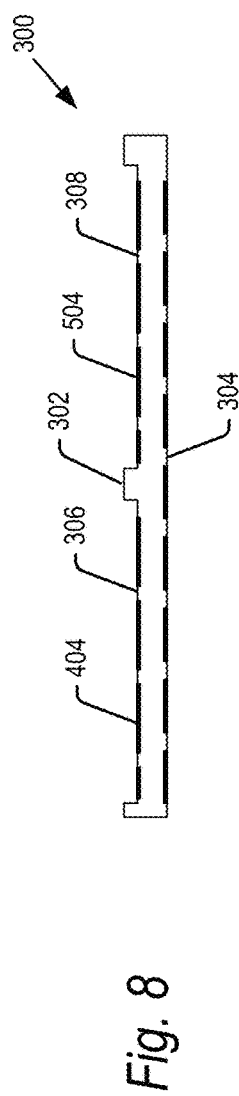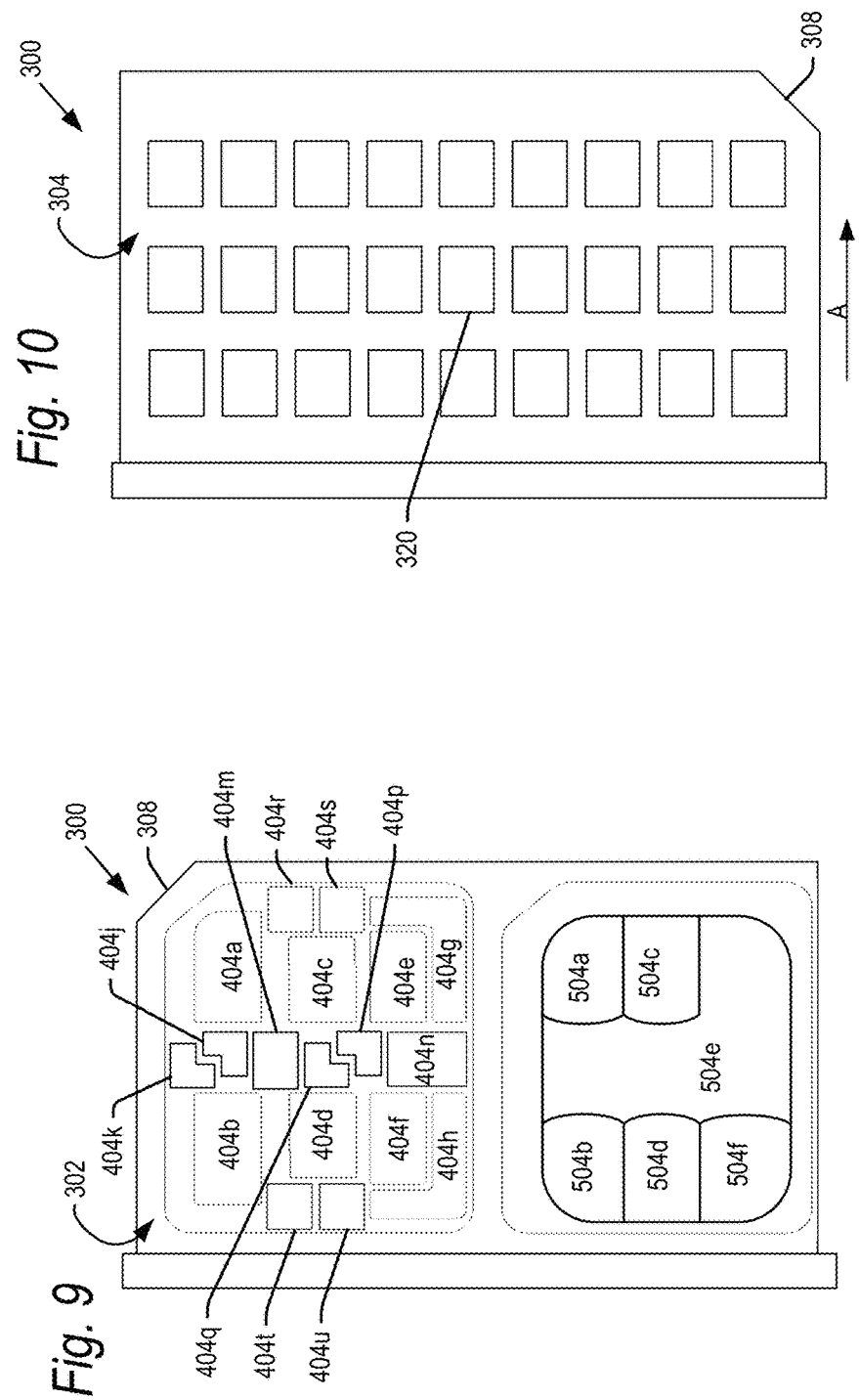

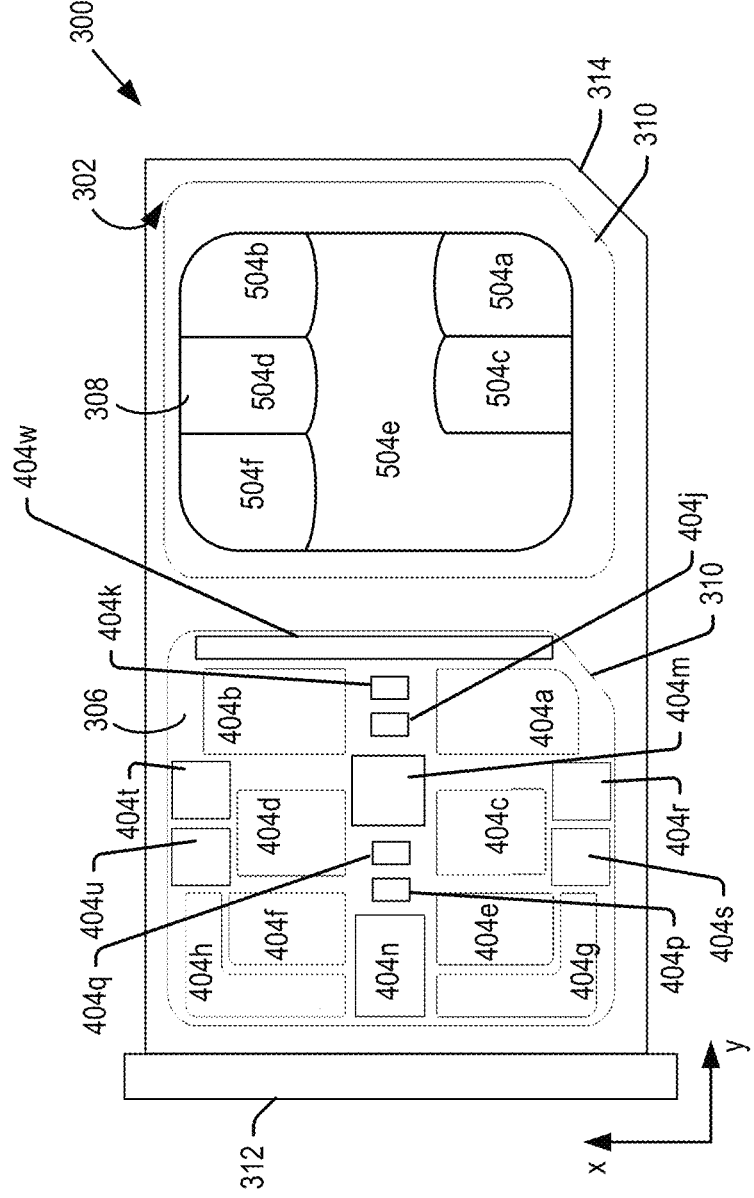

SOCKET INTERCONNECTOR WITH COMPRESSIBLE BALL CONTACTS FOR HIGH PAD COUNT MEMORY CARDS

PRIORITY CLAIM

This application claims priority to U.S. Provisional Patent Application No. 62/807,378 filed Feb. 19, 2019 entitled "SOCKET INTERCONNECTOR WITH COMPRESSIBLE BALL CONTACTS FOR HIGH PAD COUNT MEMORY CARDS", which application is incorporated herein in its entirety.

BACKGROUND

For mobile devices such as smartphones, there is a growing demand to use multiple types of cards on a single device. For example, FIG. 1 shows a recently introduced nano Memory Card (NM Card, or nano MMC card hereafter) 10 having a Multimedia Card (MMC) interface. The NM Card 10 includes a pattern of contact pads in positions corresponding to positions of the pads of a nano SIM card. Push-eject card connectors exist with a pair of sockets to support different patterns of card installation. For example, a pair of nano SIM cards may be positioned within the card connector and used within a host device card socket. Alternatively, one nano MMC card and one nano SIM card may be positioned within the card connector and used within a host device card socket.

It is further known to configure card connectors and host card sockets with openings for horizontal or vertical insertion of memory cards. For example, FIG. 2A shows a conventional card connector 20 configured to receive a pair of memory cards, such as a nano SIM card 22 and a nano MMC card 24 in a horizontal orientation. Once inserted into the card connector 20, the connector and memory cards may be inserted into the socket 26 of a host device 28, such as a mobile telephone. FIG. 2B shows a conventional card connector 30 configured to receive a pair of memory cards, such as a nano SIM card 32 and a nano MMC card 34 in a vertical orientation. Once inserted into the card connector 30, the connector and memory cards may be inserted into the socket 36 of a host device 38, such as a mobile telephone. The host card socket 36 includes a configuration of contact pins that mate with the pads of the SIM card 32 and nano MMC card 34. The host card socket 36 includes a configuration of contact pins that mates with the same pads of the SIM card 32 and nano MMC card 34, rotated 90°.

As the number of pads on memory cards increase, it is becoming increasingly difficult to provide a pad configuration that will accurately and repeatedly mate with the pins inside a host socket. For example, some nano memory cards have been proposed operating according to the PCI Express (PCIe) bus interface. Such cards may include for example 18 contact pads. Given the large number of such pads in a small area, the pins in existing card sockets are not able to reliably connect with these pads.

DESCRIPTION OF THE DRAWINGS

FIG. 5 is a cross-sectional edge view of a memory card socket interconnector according to an embodiment of the present technology.

FIG. 6 is a top view of a memory card socket interconnector according to an embodiment of the present technology.

FIG. 7 is a bottom view of a memory card socket interconnector according to an embodiment of the present technology.

FIG. 8 is a cross-sectional edge view of a memory card socket interconnector according to an alternative embodiment of the present technology.

FIG. 9 is a top view of a memory card socket interconnector according to an alternative embodiment of the present technology.

FIG. 10 is a bottom view of a memory card socket interconnector according to an alternative embodiment of the present technology.

FIGS. 19 and 20 are top views of memory card and interconnector pad configurations according to further embodiments of the present technology.

DETAILED DESCRIPTION

Figure 1:
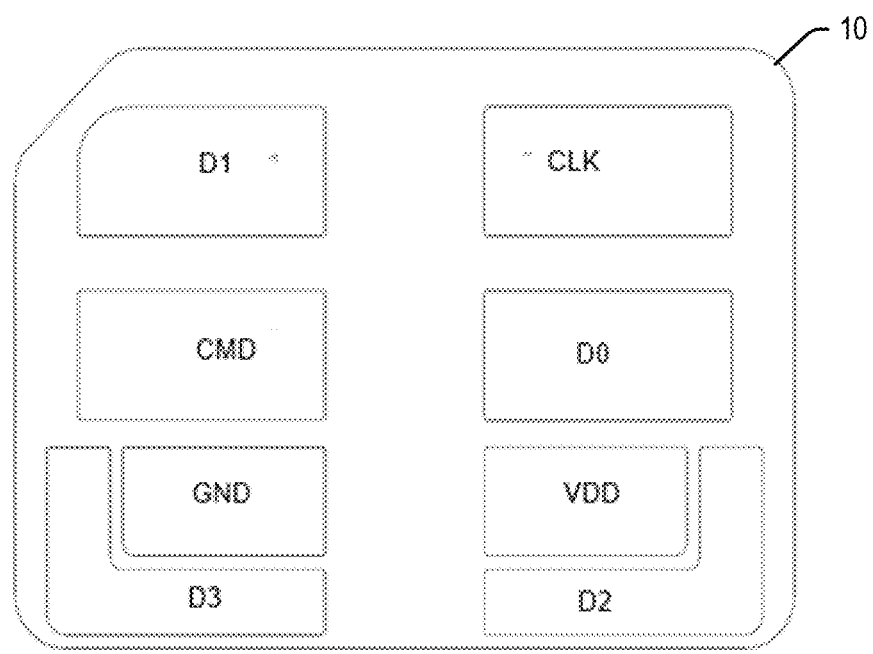
FIG. 1 is a view of a conventional nano MMC card.
Figure 2A:
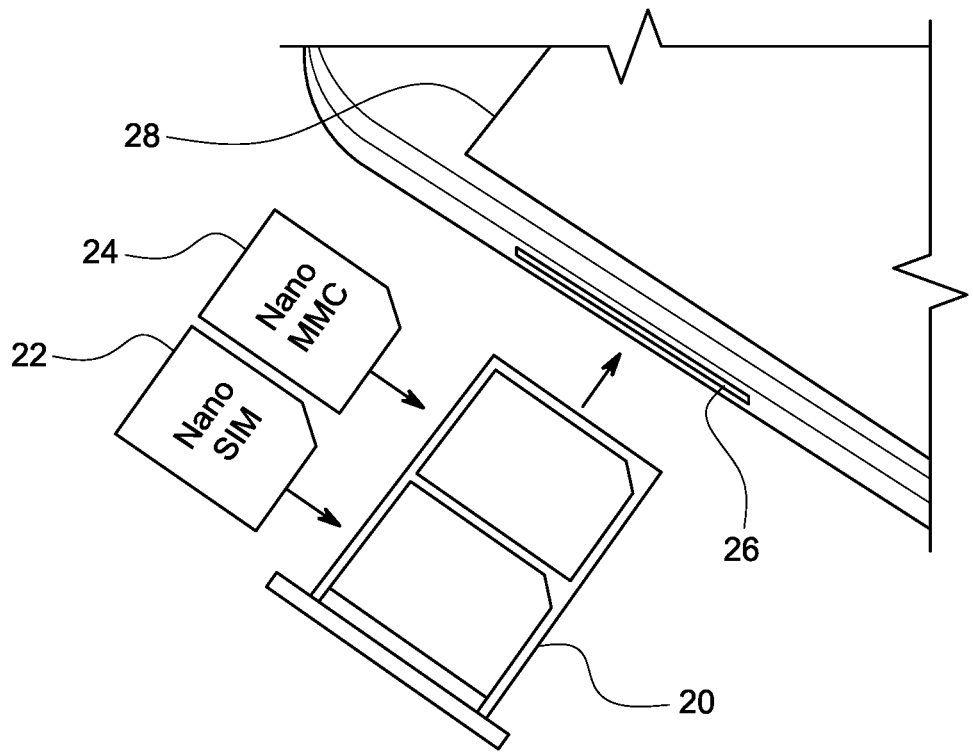
FIGS. 2A and 2B are views of conventional nano cards being inserted horizontally and vertically within a host device.
Figure 2B:
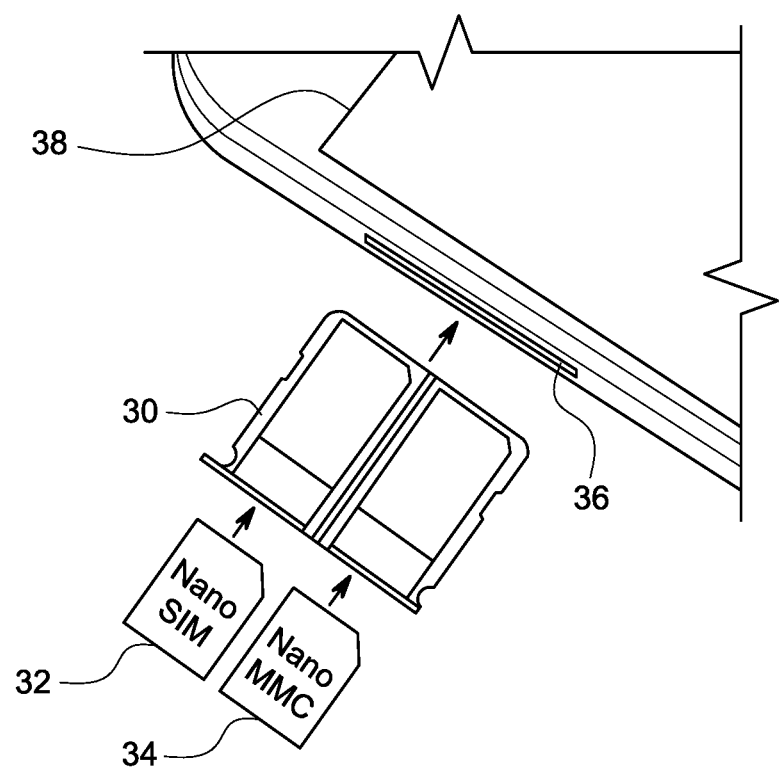

The present technology will now be described with reference to the figures, which in embodiments, relate to a memory card socket interconnector. In embodiments, the socket interconnector includes a pair of cavities configured to receive a pair of memory cards. In embodiments, the memory cards may be a nano SD Express card and a nano SIM card, but the memory cards may be configured to other standards in further embodiments. The cavities are formed partially through the socket interconnector. A first (upper) surface within each of the cavities includes a set of memory card interconnect pads mirroring the size, shape and location of the contact pads on the respective memory cards. A second (lower) surface of the socket interconnector includes socket interconnect pads distributed across the second surface of the socket interconnector. The socket interconnect pads on the second surface are distributed over a wider area than the memory card interconnect pads on the first surface.

The socket interconnector may further include a redistribution layer between the first and second surfaces to electrically redistribute the memory card interconnect pads to the socket interconnect pads. The memory cards may be inserted into the cavities of the socket interconnector. Compressible conductive balls may be applied to surfaces of the memory card interconnect pads to facilitate good electrical contact between the memory card pads and the memory card interconnect pads. The socket interconnector may then be inserted into the socket of a host device.

The host device card socket may include a configuration of pins that match the positions of the socket interconnect pads, distributed across the second surface of the socket interconnector. Data and other signals may be exchanged between the memory cards and the host device through the socket interconnector. Distributing the socket interconnect pads over a wider area than the memory card pads simplifies the design and implementation of the host device socket pins, and allows highly repeatable contact between the socket interconnect pads and host device socket pins.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top"/"bottom," "upper"/"lower" and "vertical"/"horizontal," and forms thereof, as may be used herein are by way of example and illustrative purposes only, and are not meant to limit the description of the technology in as much as the referenced item can be exchanged in position and orientation. Also, as used herein, the terms "substantially" and/or "about" mean that the specified dimension or parameter may be varied within an acceptable manufacturing tolerance for a given application.

Figure 3:
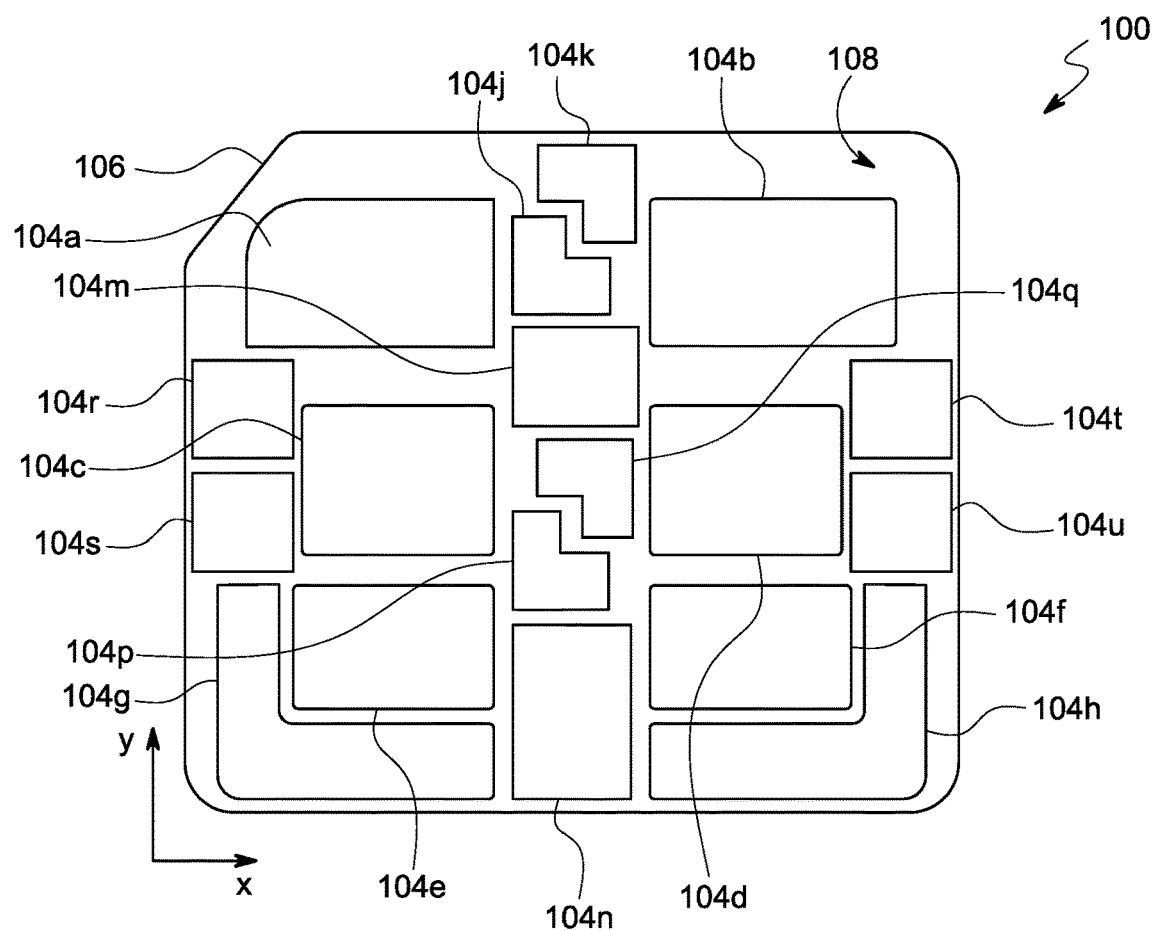
FIG. 3 is a bottom view of a nano SD Express card for use with an embodiment of the present technology.
Figure 4:
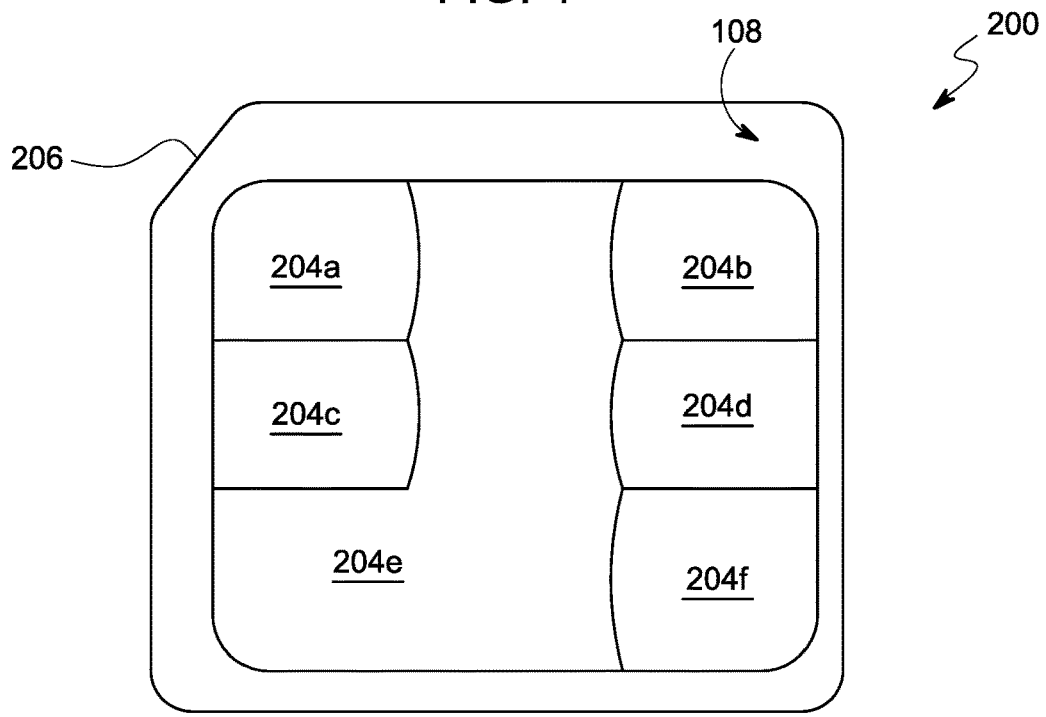
FIG. 4 is a bottom view of a nano SIM card for use with an embodiment of the present technology.

FIGS. 3 and 4 are views of bottom surfaces of a pair of memory cards 100 and 200 which may be used with the socket interconnector of the present technology. FIG. 3 is a view of a bottom surface 108 of a nano SD Express card 100. As noted, "bottom" and "top" are relative terms, and surface 108 may be a top side of card 100 (and card 200 described below) in further embodiments. The card 100 may have opposed planar surfaces (meaning at least a portion of the surfaces are planar). The card 100 may have the same form factor as a nano SIM card, with a length of 12.3 mm and a width of 8.8 mm. Other sizes are contemplated in further embodiments. The card 100 may include a corner chamfer 106 as in conventional nano SIM cards to define the orientation for insertion into a host device card socket.

The nano SD Express card 100 may include eighteen interface pads, numbered 104a-104u (collectively pads 104), configured with both the SD (or other such as MMC) bus interface and PCIe bus interface in a nano memory card form factor. The number of pads is sufficient so that there is full separation of the MMC/SD interface and the PCIe interface. It is understood that the number of pads 104 may be reduced to, for example, fourteen pads, in which case some of the signals of the MMC/SD interface and the PCIe interface share the same pads.

FIG. 3 shows one example of the configuration of pads 104 which allow the card 100 to be used in both horizontal and vertical host socket configurations. However, it is understood that the size, shape and position of the pads 104 in card 100 may be provided in a wide variety of other configurations while still supporting the MMC/SD interface and the PCIe interface in a nano memory card form factor. In further embodiments, the card 100 may include pads 104 for a PCIe nano memory card (without the SD or MMC functionality). Additionally, while embodiments of the memory card 100 are shown in the nano memory card form factor, it is understood that the memory card 100 may be in other shapes and sizes to support other standards in further embodiments.

FIG. 4 shows a bottom surface 108 of the memory card 200 including a pattern of pads 204a-204f (collectively pads 204) configured per the nano SIM standard. The SIM pads 204 shown in FIG. 4 are one example of specific SIM pads. Similar SIM functionality may be implemented in various pad patterns, as commonly done for various nano SIM cards.

While card 200 includes pads configured per the SIM bus interface, the card 200 may be configured for other bus standards, including for example for an MMC or SD card, or possibly a second PCIe card. Additionally, while embodiments of the memory card 200 are shown in the nano memory card form factor, it is understood that the memory card 200 may be in other shapes and sizes to support other standards in further embodiments. The card 200 may include a corner chamfer 206 to define the orientation for insertion into a host device card socket.

FIGS. 5, 6 and 7 show cross-sectional edge, top and bottom views, respectively, of a memory card socket interconnector 300 according to embodiments of the present technology. The socket interconnector 300 includes a top surface 302 (FIGS. 5 and 6) and a bottom surface 304 (FIGS. 5 and 7). In embodiments, the top surface 302 of the socket interconnector 300 includes a pair of cavities 306 and 308 configured to receive memory cards such as memory cards 100 and 200 described above.

In particular, cavity 306 is configured to receive memory card 100, which in embodiments, may be a nano SD Express card. In such embodiments, cavity 306 is provided with a number of memory card interconnect pads 404a-404u (collectively, pads 404). Memory card interconnect pads 404 are provided with sizes, shapes and positions so as to mirror the memory card pads 104. Thus, when memory card 100 is positioned within cavity 306, each of the memory card pads 104 will lie over its corresponding memory card interconnect pad 404 (memory card interconnect pad reference numbers are incremented by 300 relative to its corresponding memory card pad). In further embodiments, it is conceivable that there be more memory card interconnect pads 404 than there are memory card pads 104. It is also conceivable that the memory card pads 104 and the memory card interconnect pads 404 be different sizes and shapes, as long as the at least partially overlie each other.

Although it may differ in embodiments, in one example, the corresponding pads 104, 404 have the following functionalities. The pads 104a-104h/404a-404h may be SD interface pads, including for example data line D0 (pads 104d/404d), data line D1 (pads 104a/404a), data line D2 (pads 104h/404h) and data lines D3 (pads 104g/404g). Pads 104b/404b may carry a clock signal and pads 104c/404c may be a command/response line. Pads 104e/404e may be ground, and pads 104f/404f may be a voltage source $V_{DD}$.

The pads 104*j*-104*u*/404*j*-404*u* may be PCIe interface pads. For example, the pads may include a pair of transmission line pads TX+(104*j*/404*j*) and TX− (104*k*/404*k*), a pair of receiving line pads RX+(104*p*/404*p*) and RX− 104*q*/404*q*), an additional voltage source line $V_{DD2}$ (104*n*/404*n*) and an optional additional ground pad GND (104*m*/404*m*). The pads may further comprise PCIe differential reference clock pads REFCLK+(104*t*/404*t*) and REFCLK− (104*u*/404*u*), the PCIe clock request pad CLKREQ # (104*r*/404*r*) and side band signaling pad PERST # (104*s*/404*s*).

The above described functions of pads 104 and 404 is by way of example only. It is understood that the pads 104/404 may have different or other functions in further embodiments. Moreover, where a memory card 100 for use in cavity 306 had a different configuration of pads 104 from that described above, the configuration of pads 404 would change accordingly to match the pattern of pads 104.

Cavity 308 is configured to receive memory card 200, which in embodiments, may be a nano SIM card. In such embodiments, cavity 308 is provided with a number of memory card interconnect pads 504*a*-505*f* (collectively, pads 504). Memory card interconnect pads 504 are provided with sizes, shapes and positions so as to mirror the memory card pads 204 of card 200. Thus, when memory card 200 is positioned within cavity 308, each of the memory card pads 204 will lie over its corresponding memory card interconnect pad 504 (memory card interconnect pad reference numbers are incremented by 300 relative to its corresponding memory card pad). In further embodiments, it is conceivable that there be more memory card interconnect pads 504 than there are memory card pads 204. It is also conceivable that the memory card pads 204 and the memory card interconnect pads 504 be different sizes and shapes, as long as the at least partially overlie each other.

Although it may differ in embodiments, in one example, the corresponding pads 204, 504 have the following functionalities. The pads may include I/O pad (204*a*/504*a*), clock signal pad (pads 204*b*/504*b*), voltage Vpp pad (pads 204*c*/504*c*), reset pad (pads 204*d*/504*d*), ground pad (pads 204*e*/504*e*) and voltage source Vcc (pads 204*f*/504*f*). The above described functions of pads 204 and 504 is by way of example only. It is understood that the pads 204/504 may have different or other functions in further embodiments. Moreover, where a memory card 200 for use in cavity 308 had a different configuration of pads 204 from that described above, the configuration of pads 504 would change accordingly to match the pattern of pads 204.

The cavities 306, 308 may be provided to a depth such that, when the memory cards are loaded into the cavities, an upper surface of the memory cards may be flush with, or slightly above, the top surface 302, such that the memory cards and interconnect are fit snugly (top to bottom) within the socket of a host device. It is understood that the configuration of pads 404 and 504 in cavities 306 and 308 may be switched, so that cavity 308 receives memory card 100 and cavity 306 receives memory card 102.

The cavities 306 and 308 may have a perimeter shape matching that of cards 100 and 200, with one corner having diagonal profile 310 for receiving chamfers 108, 208 to ensure the cards 100, 200 are properly inserted within cavities 306, 308. The memory card socket interconnector 300 may further include finger grip 312 to facilitate insertion of the interconnector 300 into a memory card socket as explained below. The interconnector 300 may further include a chamfer 314 to ensure proper insertion of the interconnector 300 into the host device socket.

FIGS. 5 and 7 show a bottom surface 304 of interconnector 300 including a number of socket interconnect pads 320 (one of which is numbered in each of FIGS. 5 and 7). Interconnect pads 320 may be distributed (evenly or unevenly) across at least a majority of the bottom surface 304. In one embodiment, the pads 320 may each have a length (along the x-axis) of 2 mm and a width (along the y-axis) of 1.5 mm, with a spacing between each pad 320 of 0.5 to 2 mm. These dimensions and spacing between pads is by way of example only and may vary in further embodiments. There may be at least as many socket interconnect pads 320 on surface 304 as there are memory card interconnect pads 404, 504 on surface 302. As explained hereinafter, the memory card interconnect pads 404, 504 on surface 302 may be electrically connected and electrically redistributed to socket interconnect pads 320.

The embodiment of the memory card socket interconnector 300 shown in FIGS. 5-7 is configured for horizontal insertion of memory cards 100 and 200 into a host device socket in the direction of arrow A (FIG. 7). FIGS. 8-10 show an alternative embodiment of the memory card socket interconnector 300 configured for vertical insertion of memory cards 100 and 200 into a host device socket in the direction of arrow A (FIG. 10). The embodiment of interconnector 300 shown in FIGS. 8-10 may be generally the same as that shown in FIGS. 5-7, including cavities 306 and 308 configured as described above to receive memory cards 100 and 200 (rotated 90°). As above, cavity 306 includes memory card interconnect pads 404 as the mirror image of memory card pads 104, and cavity 308 includes memory card interconnect pads 504 as the mirror image of memory card pads 204. The socket interconnect pads 320 shown in FIGS. 8-10 may be the same as socket interconnect pads 320 shown in FIGS. 5-7 (rotated 90°).

Figure 11:
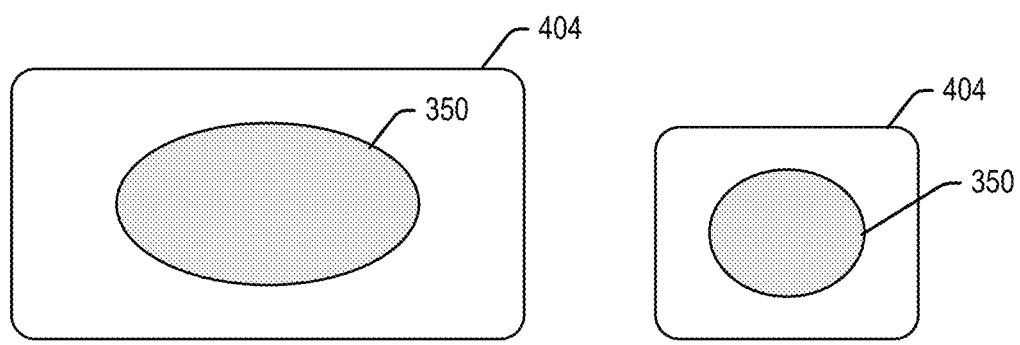
FIG. 11 is a top view of a pair of memory card interconnect pads during fabrication of the memory card socket interconnector according to embodiments of the present technology.
Figure 12:
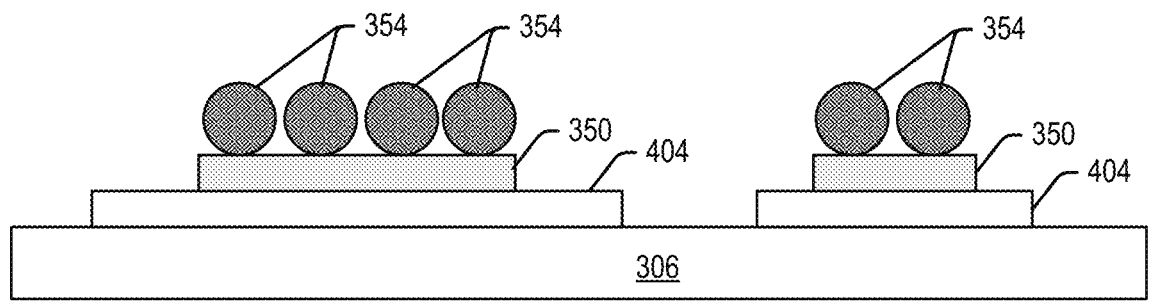
FIG. 12 is an edge view of a pair of memory card interconnect pads during fabrication of the memory card socket interconnector according to embodiments of the present technology.

FIGS. 11 and 12 are top and edge views of a pair of memory card interconnect pads 404 during fabrication. The pads 404 shown can be any of the pads 404 described above, and the following applies to each of the pads 404. The following may also apply to each of the memory card interconnect pads 504. In order to facilitate good electrical contact between the memory card pads 104, 204 and the memory card interconnect pads 404, 504, compressible conductive balls may be applied to the surfaces of the interconnect pads 404 and/or 504 as explained below.

As shown in the top view of FIG. 11, a layer of epoxy 350 may be applied discretely to each of the memory card interconnect pads 404. The layer of epoxy 350 may be applied as a liquid (A-stage) and partially cured to a B-stage. In embodiments, the epoxy layer 350 may be 10 μm to 50 μm thick, such as for example 25 μm thick. The epoxy layer 350 may be thinner or thicker than that in further embodiments. The epoxy layer 350 is shown as having an oval or circular shape. The epoxy layer may be applied in other shapes in further embodiments. The epoxy layer 350 is shown partially covering the interconnect pads 404, but the layer 350 may cover the entire surface of interconnect pads 404 in further embodiments.

As shown in the edge view of FIG. 12, compressible balls 354 may be sprayed or otherwise applied onto the surfaces of memory card interconnect pads 404. The compressible balls 354 stick to the surface of epoxy layer 350. The compressible balls 354 do not stick to any areas of the pads 404 not including epoxy, and do not stick to areas of the cavities 306, 308 (also not having epoxy).

The compressible balls 354 may be formed of an electrical conductor coated onto compressible polymer balls. The electrical conductor may for example be gold, though other conductive materials are used in further embodiments. The polymer balls may be circular, though they may be otherwise in further embodiments. The compressible balls may have a diameter of between 25 µm and 75 µm, such as for example 50 µm. Compressible balls should have the same diameters within tolerances, and should have diameters that are larger than the thickness of epoxy layer 350.

Figure 13:
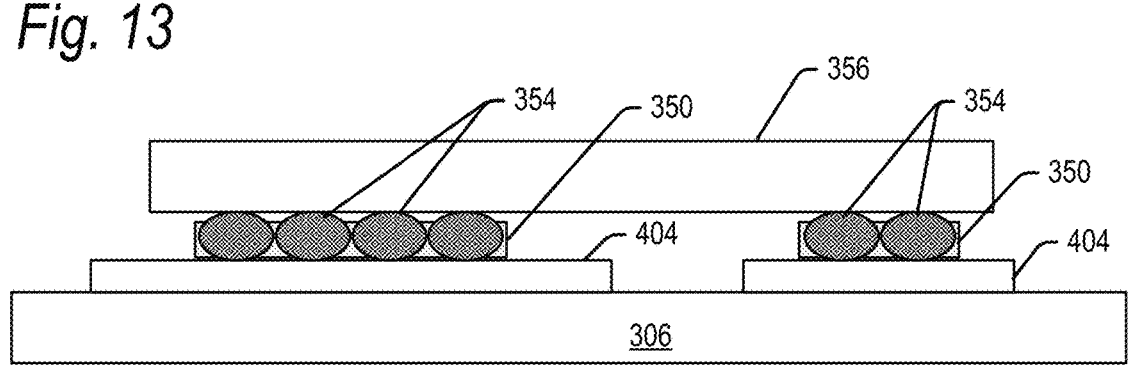
FIGS. 13 and 14 are edge views of a pair of memory card interconnect pads during a still later stage of fabrication of the memory card socket interconnector according to embodiments of the present technology.

As shown in the edge view of FIG. 13, the compressible balls 354 may be pushed down into epoxy layer 350, against the pads 404, for example by a platen 356. The platen 356 may also compress the balls 354 to ensure good contact against the pads 404. At the same time, the epoxy layer 350 may be cured to a solid (C-stage) to fix the balls 354 in position against the pads 404. The platen 356 may be heated for this purpose. Alternatively or additionally, the interconnector 300 and heated of the epoxy layer 350 may otherwise be cured.

Figure 14:
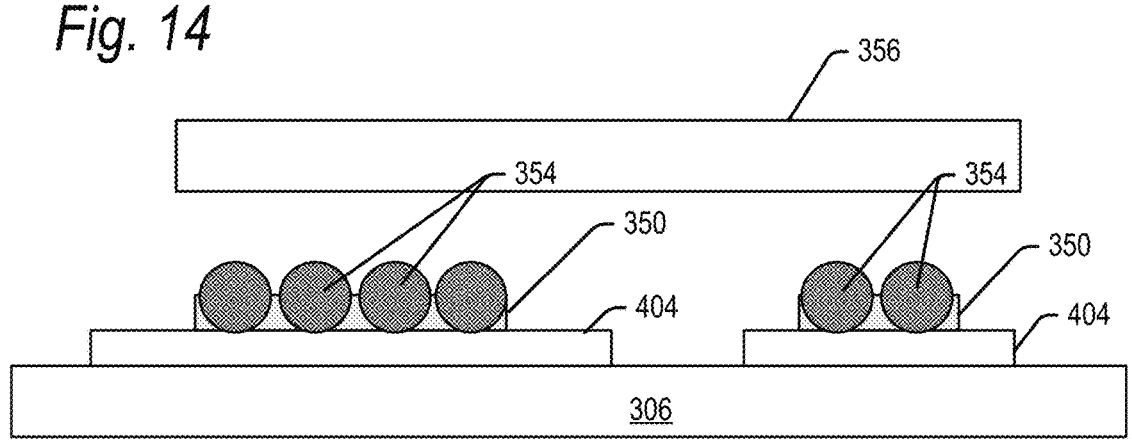
Figure 15:
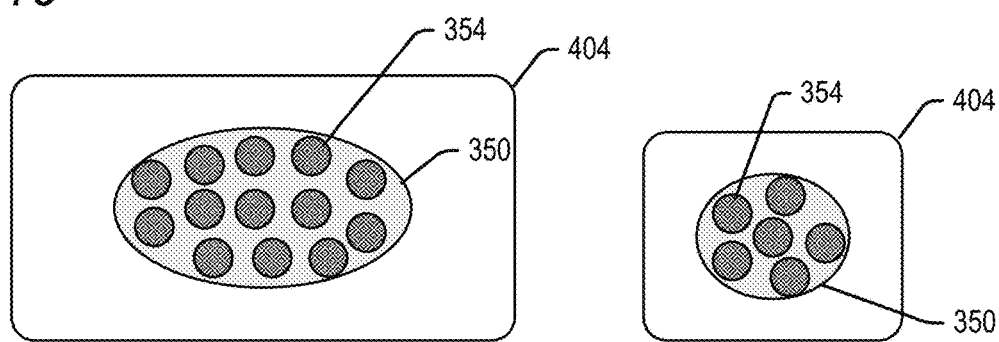
FIG. 15 is a top view of the pair of memory card interconnect pads shown in FIG. 14.

As shown in the edge view of FIG. 14, once the epoxy layer is cured, the platen 356 may be removed, at which point the balls 356 return to their original (e.g., circular) shape. The result is a number of compressible balls 354 embedded within epoxy layer 350 against the surfaces of the pads 404 as shown in the edge view of FIG. 14 and the top view of FIG. 15. The balls 354 extend 10 µm to 30 µm above a surface of the epoxy layer 350, though the balls 354 may extend above the surface of epoxy layer 350 by more or less and that in further embodiments.

When memory cards 100, 200 are placed into cavities 306, 308 and inserted into the host device socket as explained below, the memory card pads 104, 204 are pressed down against memory card interconnect pads 404, 504, compressing the balls 354 and ensuring good electrical contact between the pads 104, 204 and pads 404, 504. The density of balls 354 (i.e., spacing between balls) on pads 404, 504 may vary in embodiments. Contact with only a few balls 354, such as for example between 3 and 10 balls, is sufficient for good electrical contact between the memory card pad 104, 204 and a memory card interconnect pad 404, 504. Additionally, as the balls are only applied to an epoxy on the pads 404, 504, this scheme avoids the possibility of electrical shorting between adjacent pad 404, 504.

Figure 16:
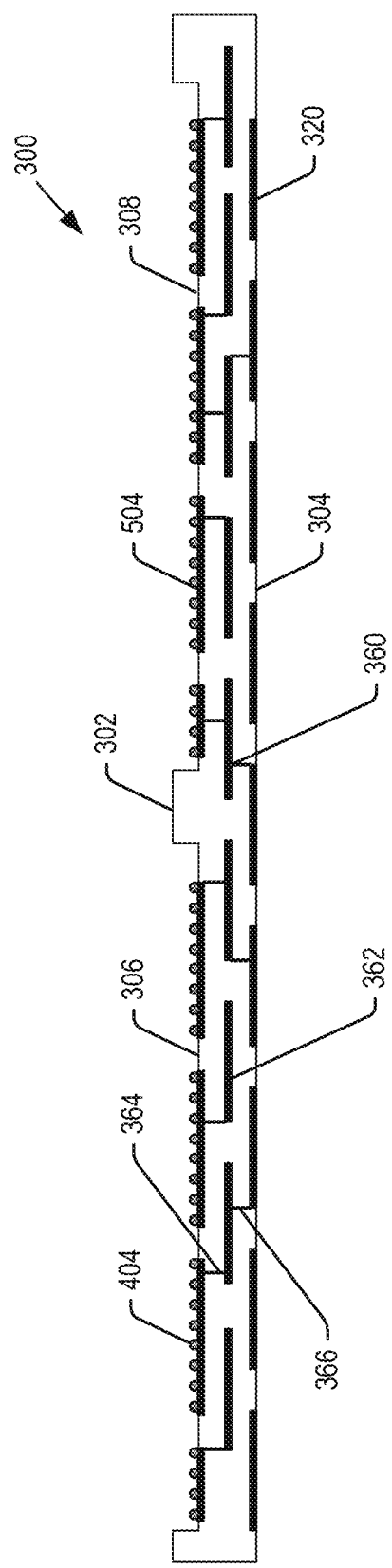
FIG. 16 is a cross-sectional edge view of a memory card socket interconnector showing the redistribution layer according to an embodiment of the present technology.

As noted above, the memory card interconnect pads 404, 504 on surface 302 of interconnector 300 may be electrically connected and electrically redistributed to socket interconnect pads 320 on surface 304. Referring now to the cross-sectional edge view of FIG. 16, the socket interconnector 300 may further include a redistribution layer 360 between the top and bottom surfaces 302, 304. The redistribution layer 360 electrically interconnects the memory card interconnect pads 404, 504 and the socket interconnect pads 320. The redistribution layer 360 may comprise an etched conductive pattern 362 residing in one or more planes between the top and bottom surfaces 302, 304. The redistribution layer 360 may further include, a first series of vias 364 extending between the memory card interconnect pads 404, 504 and the etched conductive pattern 362, and a second series of vias 366 extending between the socket interconnect pads 320 and the etched conductive pattern 362.

As noted in the Background section, the large number of memory card contact pads in a small area, for example as in a nano SD Express Card, presents problems with respect to reliable and repeatable contact with these pads by pins within a host socket. This problem is solved in the present technology by the interconnector 300. The interconnector 300 effectively redistributes the large number of contact pads from the small area of the nano card footprint to the larger area of the bottom surface of the interconnector 300.

Figure 17:
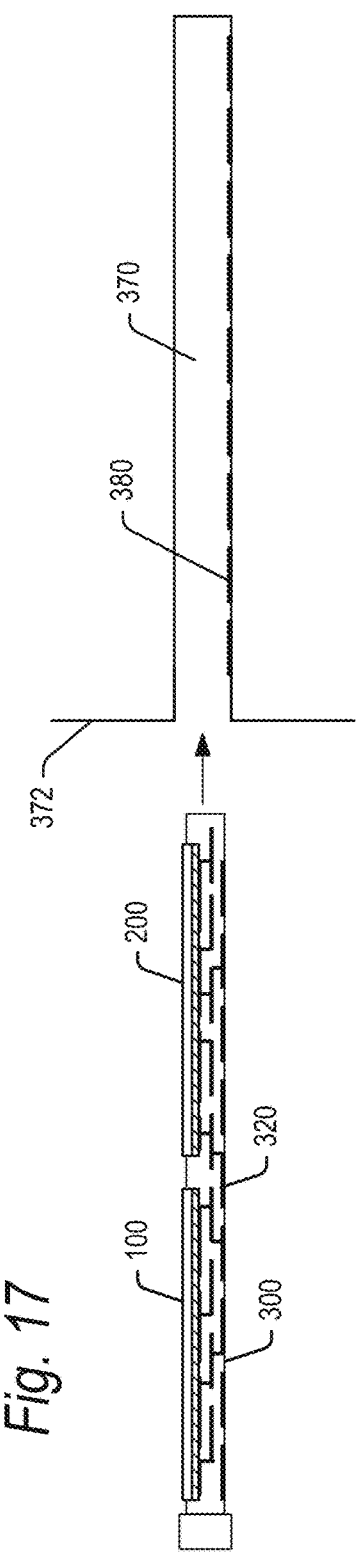
FIG. 17 is a cross-sectional edge view of a memory card socket interconnector supporting a pair of memory cards as they are being inserted into a host device socket.

FIG. 17 is a cross-sectional edge view showing a memory card socket interconnector 300 being inserted into a socket 370 of a host device 372. The host device 372 may for example be a mobile telephone, but may be a variety of other computing devices in further embodiments, such as for example desktop computers, laptop computers, tablets, automotive computing systems, cameras and a wide variety of other devices utilizing a removable non-volatile memory.

Figure 18:
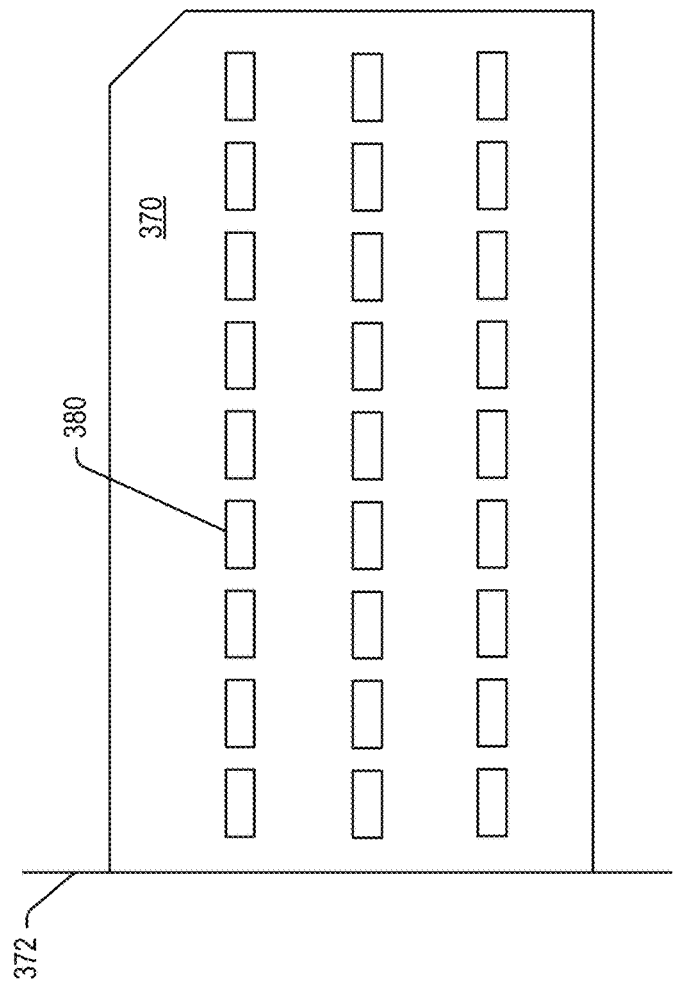
FIG. 18 is a top view of a configuration of pins within the socket of a host device for mating with pads on a bottom surface of the interconnector.

As shown in FIG. 17, the memory cards 100 and 200 been loaded into the memory card socket interconnector 300 in preparation for loading the interconnector 300 into the socket 370. As shown in the cross-sectional edge view of FIG. 17 and the top view of FIG. 18, a pattern of socket pins 380 may be provided in a bottom surface of the socket 370. Socket pins 380 may be provided in a pattern matching that of the socket interconnect pads 320 on the bottom surface of the interconnector 300. Thus, the socket pins 380 may electrically contact each of the socket interconnect pads 320 (or at least those pads 320 electrically coupled to a memory card interconnect pad 404, 504) upon insertion of the interconnector 300 in the socket 370.

The socket 370 may be sized or otherwise provided with mechanisms to ensure a tight fit (top to bottom) of the interconnector 300 and memory cards 100, 102 in the socket 370. This facilitates good mating between the memory card pads 104, 204 and the memory card interconnect pads 404, 504. This also facilitates good electrical coupling between the socket interconnect pads 320 and the socket pins 380.

Embodiments described above show an interconnector 300 supporting a pair of memory cards 100, 200. However, in further embodiments, the interconnector 300 may support a single memory card, such as memory card 100. In this case, the memory card socket interconnect 300 have a smaller footprint. However, in such embodiments, as in the embodiments described above, the interconnector 300 effectively redistributes the contact pads 104 of memory card 100 over a larger area of the bottom surface of the interconnector 300. This redistribution enables a more reliable and repeatable contact with these pads by pins within a host socket than is possible where the socket pins are confined to the footprint of the memory card.

Figure 19:
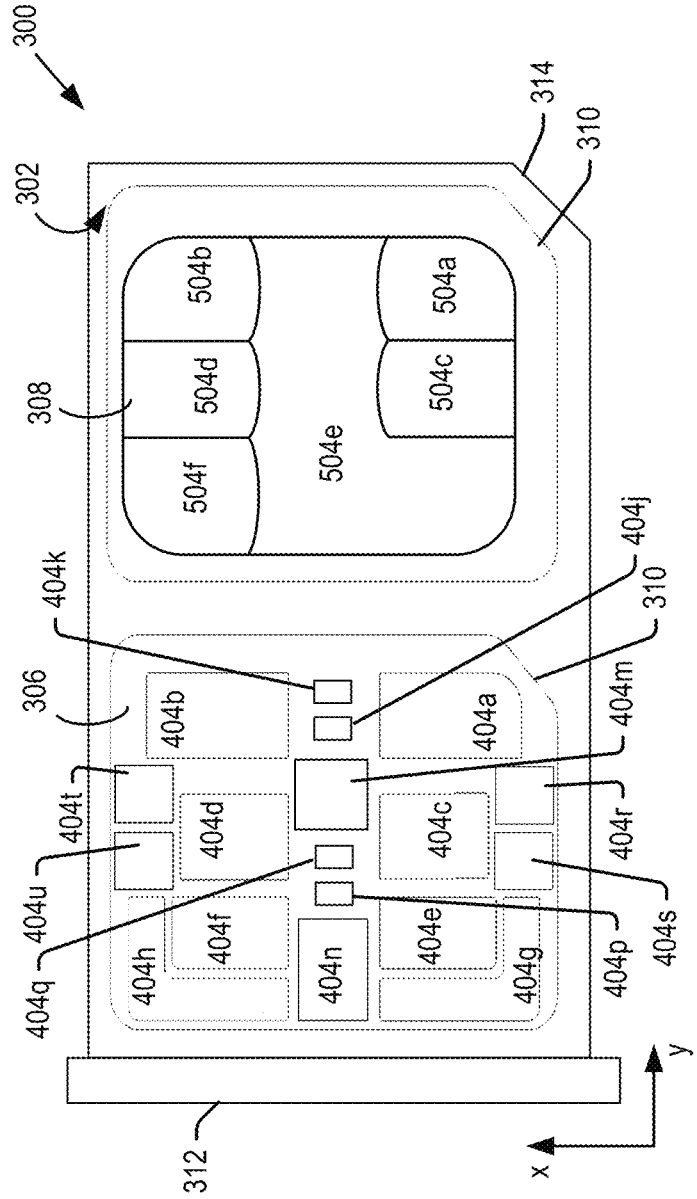

As noted above, the memory card pads 104, 204 and the corresponding memory card interconnect pads 404, 504 may be different shapes. FIG. 19 shows a further embodiment where the TX+ pads (104*j*/404*j*), TX– pads (104*k*/404*k*), RX+ pads (104*p*/404*p*) and RX– 104*q*/404*q*) are rectangular or square instead of "L"-shaped. These (and other) pads may have been provided with an "L" shape or a "T" shape to enable contact between the pads and host device socket pins in both horizontal and vertical insertion orientations where the host device socket pins contact the memory card pads directly while the card slides into the socket. Further details of such pads are disclosed in Indian Patent Application No. 201941002542, entitled "Memory Card Pad Layout Supporting Multiple Communication Protocols", by Yosi Pinto et al.

However, as described above, it is a feature of the present technology that the host device socket pins do not make direct contact with the memory card pads. Contact is made through the interconnector 300. As such, each of the memory card pads 104, 204 and memory card interconnect pads 404, 504 may be rectangular or square, as shown in FIG. 19. That is allowed since in the present technology the cards' pads do not slide either horizontally or vertically while inserted, but simply placed on the interconnect pads. The present technology in general allows the size of the memory card pads 104, 204 and the memory card interconnect pads 404, 505 to be reduced as compared to conventional schemes where the socket pins make direct contact with the memory card pads. As one example, the pads 104j, 104k, 104p, 104q and/or the pads 404j, 404k, 404p, 404q may have an area of between 0.125 mm² and 0.2 mm². However, it is understood that the area of these pads may be larger or smaller than this in further embodiments. Smaller pads reduces the capacitance and allow better performance in higher frequencies. It will also advantageously allow for a larger ground pad.

FIG. 20 shows a further alternative embodiment which is similar to FIG. 19, but further includes a thermal pad 404w. The thermal pad 404w, as well as the other pads 404, 504 in the interconnector 300, may be used to conduct heat out of the cards 100, 200. Heat may be conducted directly through the pads 404w and other pads to the interconnector 300 and then to the chassis of the host device. Having such direct thermal coupling allows much better thermal conductivity to the outside air and may enable higher performance/power cards to be used. Alternatively, heat may be conducted indirectly, through any portion of the interconnector 300 to the chassis of the host device.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A memory card socket interconnector configured to support one or more memory cards in a socket of a host device, the memory card socket interconnector comprising:
a set of memory card interconnect pads on a first surface of the memory card socket interconnector, the set of memory card interconnect pads configured to mate with pads on the one or more memory cards;
an electrically conductive epoxy layer adhered to discrete ones of the memory card interconnect pads, the electrically conductive epoxy layer configured to facilitate electrical contact between the set of memory card interconnect pads and the pads on the one or more memory cards;
a set of socket interconnect pads on a second surface of the memory card socket interconnector opposite the first surface, the set of socket interconnect pads configured to mate with pins within the socket of the host device; and
a redistribution layer between the first and second surfaces configured to electrically redistribute the set of memory card interconnect pads to the set of socket interconnect pads, wherein each memory card interconnect pad of a plurality of the set of memory card interconnect pads is redistributed to a larger socket interconnect pad.

2. The memory card socket interconnector of claim 1, wherein:
the memory card socket interconnector is further configured to support a first memory card having a PCI express (PCIe) interface; and
the set of memory card interconnect pads mirrors a configuration of the pads on the first memory card.

3. The memory card socket interconnector of claim 2, wherein:
the memory card socket interconnector is further configured to support a second memory card in addition to the first memory card; and
the second memory card has at least one of a PCIe interface, a SIM interface, an SD interface and a multimedia card interface.

4. The memory card socket interconnector of claim 3, wherein:
the set of memory card interconnect pads mirroring a configuration of the pads on the first memory card comprises a first set of memory card interconnect pads; and
the memory card socket interconnector further comprises a second set of memory card interconnect pads mirroring a configuration of the pads on the second memory card.

5. The memory card socket interconnector of claim 1, wherein the electrically conductive epoxy comprises electrically conductive balls in contact with and extending above surfaces of the memory card interconnect pads.

6. A memory card socket interconnector configured to support one or more memory cards in a socket of a host device, the memory card socket interconnector comprising:
a set of memory card interconnect pads on a first surface of the memory card socket interconnector, the set of memory card interconnect pads having a pattern mirroring a pattern of pads on the one or more memory cards;
electrically conductive balls formed on the set of memory card interconnect pads on the first surface of the memory card socket interconnector, the electrically conductive balls configured to facilitate electrical contact between the set of memory card interconnect pads on the first surface of the memory card socket interconnector and the pads on the one or more memory cards;
a set of socket interconnect pads on a second surface of the memory card socket interconnector opposite the first surface, the set of socket interconnect pads configured to mate with pins within the socket of the host device; and
a redistribution layer between the first and second surfaces configured to electrically redistribute the set of memory card interconnect pads to the set of socket interconnect pads.

7. The memory card socket interconnector of claim 6, wherein:
the memory card socket interconnector is configured to support a first memory card having a PCI express (PCIe) interface; and
the set of memory card interconnect pads mirrors a configuration of the pads on the first memory card.

8. The memory card socket interconnector of claim 7, wherein:
the memory card socket interconnector is configured to support a second memory card in addition to the first memory card; and
the second memory card has at least one of a PCIe interface, a SIM interface, an SD interface and a multimedia card interface.

9. The memory card socket interconnector of claim 6, wherein the conductive balls are suspended in an epoxy applied to the surfaces of the memory card interconnect pads.

10. The memory card socket interconnector of claim 1, further comprising a cavity formed in a first surface of the memory card socket interconnector, wherein the set of memory card interconnect pads are provided in the cavity.

11. The memory card socket interconnector of claim 10, wherein:
the set of memory card interconnect pads comprise a first set of memory card interconnect pads;
the cavity comprises a first cavity; and
the memory card socket interconnector further comprises:
a second set of memory card interconnect pads; and
a second cavity formed in a first surface of the memory card socket interconnector, wherein the second set of memory card interconnect pads are provided in the second cavity.

12. The memory card socket interconnector of claim 11, wherein the first set of memory card interconnect pads are configured for the PCI express (PCIe) interface.

13. The memory card socket interconnector of claim 11, wherein the first second set of memory card interconnect pads are configured for one of the PCI express (PCIe) interface, a SIM interface, an SD interface and a multimedia card interface.

14. The memory card socket interconnector of claim 1, wherein the electrically conductive epoxy comprises a plurality of electrically conductive balls.

15. The memory card socket interconnector of claim 14, wherein the plurality of electrically conductive balls protrude from a surface of the electrically conductive epoxy.

16. The memory card socket interconnector of claim 14, wherein the plurality of electrically conductive balls comprise an electrical conductor coated onto compressible polymer balls.

17. The memory card socket interconnector of claim 6, wherein the plurality of electrically conductive balls are embedded in an electrically conductive epoxy layer.

18. The memory card socket interconnector of claim 17, wherein the plurality of electrically conductive balls protrude from a surface of the electrically conductive epoxy.

19. The memory card socket interconnector of claim 17, wherein the plurality of electrically conductive balls comprise an electrical conductor coated onto compressible polymer balls.

20. A memory card socket interconnector configured to support one or more memory cards in a socket of a host device, the memory card socket interconnector comprising:
a set of memory card interconnect pads on a first surface of the memory card socket interconnector, the set of memory card interconnect pads configured to mate with pads on the one or more memory cards;
first means, provided on surfaces of the set of memory card interconnect pads, for facilitating electrical contact between the set of memory card interconnect pads and the pads on the one or more memory cards;
a set of socket interconnect pads on a second surface of the memory card socket interconnector opposite the first surface, the set of socket interconnect pads configured to mate with pins within the socket of the host device; and
second means, between the first and second surfaces, for electrically redistributing the set of memory card interconnect pads to the set of socket interconnect pads, wherein each memory card interconnect pad of a plurality of the set of memory card interconnect pads is redistributed to a larger socket interconnect pad.

\* \* \* \* \*